US011415818B2

(12) United States Patent
Olgun et al.

(10) Patent No.: US 11,415,818 B2
(45) Date of Patent: *Aug. 16, 2022

(54) NEAR-FIELD ANTENNA FOR EYEWEAR

(71) Applicant: Snap Inc., Santa Monica, CA (US)

(72) Inventors: Ugur Olgun, Venice, CA (US); Patrick Kusbel, Longmont, CO (US); Russell Douglas Patton, Marina Del Rey, CA (US); Jonathan M Rodriguez, II, Los Angeles, CA (US); Patrick Timothy McSweeney Simons, Downey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,004

(22) Filed: Dec. 11, 2019

(65) Prior Publication Data

US 2020/0264455 A1 Aug. 20, 2020

Related U.S. Application Data

(63) Continuation of application No. 15/664,485, filed on Jul. 31, 2017, now Pat. No. 10,534,203.

(51) Int. Cl.
*G02C 11/00* (2006.01)
*H01Q 1/27* (2006.01)
(Continued)

(52) U.S. Cl.
CPC ............. *G02C 11/10* (2013.01); *H01Q 1/273* (2013.01); *H01Q 7/00* (2013.01); *H02J 7/025* (2013.01);
(Continued)

(58) Field of Classification Search
CPC .......... G02B 2027/0178; G02B 27/017; G02B 2027/014; G02B 27/0093; G02B 27/0172;
(Continued)

(56) References Cited

U.S. PATENT DOCUMENTS

| 10,534,203 B2 | 1/2020 | Olgun et al. |
| 2015/0364822 A1 | 12/2015 | O'driscoll |

(Continued)

FOREIGN PATENT DOCUMENTS

| CN | 204964924 | 1/2016 |
| CN | 110945410 A | 3/2020 |

(Continued)

OTHER PUBLICATIONS

U.S. Appl. No. 15/664,485 U.S. Pat. No. 10,534,203, filed Jul. 31, 2017, Near-Field Antenna For Eyewear.
(Continued)

*Primary Examiner* — Golam Sorowar
(74) *Attorney, Agent, or Firm* — Schwegman Lundberg & Woessner, P.A.

(57) ABSTRACT

Apparatuses and systems for wearable devices such as eyewear are described. According to one embodiment, the wearable device includes a frame, onboard electronics components, and an antenna disposed around an eyepiece area of the frame that is configured to hold an optical element. The antenna is configured for inductive coupling. In some embodiments, a switch coupled to the antenna allows selection between circuitry for inductive charging of a battery and near-field communication (NFC) circuitry for communicating data via the antenna.

15 Claims, 12 Drawing Sheets

(51) Int. Cl.
*H02J 7/02* (2016.01)
*H04B 5/00* (2006.01)
*H04B 1/18* (2006.01)
*H01Q 7/00* (2006.01)
*H04B 1/3827* (2015.01)
*H02J 50/10* (2016.01)
*G06Q 20/32* (2012.01)
*H01Q 5/50* (2015.01)

(52) U.S. Cl.
CPC .............. *H02J 50/10* (2016.02); *H04B 1/18* (2013.01); *H04B 1/385* (2013.01); *H04B 5/0031* (2013.01); *H04B 5/0075* (2013.01); *G06Q 20/3278* (2013.01); *H01Q 5/50* (2015.01)

(58) Field of Classification Search
CPC .... G02B 2027/0138; G02B 2027/0187; G02B 2027/0156; G02B 2027/0118; G02B 2027/0132; G02B 27/0176; G02B 2027/0169; G02B 27/022; G02B 27/028; G02B 2027/011; G02B 2027/0112; G02B 2027/0123; G06F 1/163; G06F 3/013; G06F 3/017; G06F 3/011; G06F 3/005; G06F 3/012; G06F 3/016; G06F 3/16; G06F 3/041; G06F 3/14; G06F 3/167; G06F 1/1632; G06F 3/03547; G06F 3/0362; G06F 3/0412; G06F 3/0346; G06F 3/015; G06F 3/0488; G06F 1/1643; G02C 11/10; G02C 11/06; G02C 5/143; G02C 5/14; G02C 7/083; G02C 5/146; G02C 7/16; G02C 11/04; G02C 5/001; G02C 7/06; G02C 7/101; G02C 11/00; G02C 2200/08; G02C 3/003; G02C 2200/02; G02C 5/02; G02C 5/22
See application file for complete search history.

(56) References Cited

U.S. PATENT DOCUMENTS

| | | | |
|---|---|---|---|
| 2016/0006290 A1* | 1/2016 | Ho | H04B 5/0075 320/108 |
| 2016/0109729 A1* | 4/2016 | Swab | G06F 1/163 351/116 |
| 2016/0204839 A1* | 7/2016 | Liu | G06F 1/1698 345/8 |
| 2017/0264817 A1 | 9/2017 | Yan et al. | |
| 2017/0353821 A1 | 12/2017 | Evans, V et al. | |
| 2018/0203260 A1 | 7/2018 | Blum | |
| 2018/0345016 A1* | 12/2018 | Agada | A61B 5/002 |
| 2019/0033622 A1 | 1/2019 | Olgun et al. | |

FOREIGN PATENT DOCUMENTS

| | | |
|---|---|---|
| DE | 20103525 U1 | 3/2003 |
| DE | 202014000402.1 | 8/2015 |
| WO | WO-9901063 A1 | 1/1999 |
| WO | WO-2015191301 A1 | 12/2015 |
| WO | WO-2016112818 A1 | 7/2016 |
| WO | WO-2017040633 A1 | 3/2017 |
| WO | WO-2017049072 A1 | 3/2017 |
| WO | WQ-2019028019 A1 | 2/2019 |

OTHER PUBLICATIONS

"European Application Serial No. 18753522.4, Response filed Sep. 7, 2020 to Communication Pursuant to Rules 161(1) and 162 EPC dated Mar. 10, 2020", 21 pgs.
"Chinese Application Serial No. 201880048502.8, Office Action dated Aug. 21, 2020", w/ English translation, 8 pgs.
"Chinese Application Serial No. 201880048502.8, Response Filed Dec. 22, 2020 to Office Action dated Aug. 21, 2020", w/English Claims, 14 pgs.
"Chinese Application Serial No. 201880048502.8, Office Action dated Jan. 26, 2021", w/ English Translation, 9 pgs.
"Korean Application Serial No. 10-2020-7005776, Notice of Preliminary Rejection dated Mar. 12, 2021", w/ English Translation, 16 pgs.
"U.S. Appl. No. 15/664,485, Non Final Office Action dated Mar. 28, 2019", 26 pgs.
"U.S. Appl. No. 15/664,485, Notice of Allowance dated Sep. 4, 2019", 12 pgs.
"U.S. Appl. No. 15/664,485, Response filed Jun. 27, 2019 to Non-Final Office Action dated Mar. 28, 2019", 11 pgs.
"International Application Serial No. PCT/US2018/044599, International Preliminary Report on Patentability dated Feb. 13, 2020", 11 pgs.
"International Application Serial No. PCT/US2018/044599, International Search Report dated Sep. 24, 2018", 5 pgs.
"International Application Serial No. PCT/US2018/044599, Written Opinion dated Sep. 24, 2018", 9 pgs.
"Chinese Application Serial No. 201880048502.8, Office Action dated Jun. 9, 2021", w/English Translation, 11 pgs.
"Chinese Application Serial No. 201880048502.8, Response filed Apr. 6, 2021 to Office Action dated Jan. 26, 2021", w/ English Claims, 13 pgs.
"Chinese Application Serial No. 201880048502.8, Response filed Aug. 18, 2021 to Office Action dated Jun. 9, 2021", w/ English Claims, 15 pgs.
"Korean Application Serial No. 10-2020-7005776, Final Office Action dated Sep. 20, 2021", w/ English Translation, 7 pgs.
"Korean Application Serial No. 10-2020-7005776, Response filed Oct. 25, 2021 to Final Office Action dated Sep. 20, 2021", w/ English Claims, 14 pgs.
"Korean Application Serial No. 10-2022-7005280, Notice of Preliminary Rejection dated May 24, 2022", W/English Translation, 16 pgs.

* cited by examiner

NEAR-FIELD ANTENNA FOR EYEWEAR

PRIORITY CLAIM

This application is a continuation of and claims the benefit of priority of U.S. patent application Ser. No. 15/664,485, filed Jul. 31, 2017, which is hereby incorporated by reference herein in its entirety.

TECHNICAL FIELD

The subject matter disclosed herein generally relates to eyewear, and more specifically to electronics-enabled eyewear with near-field communication or inductive battery charging components.

BACKGROUND

Eyewear, especially those carrying onboard electronics, can be bulky with significant size and weight tradeoffs associated with communication, battery, and charging systems, making them difficult to wear and charge. These and other factors often cause electronically-enabled eyewear to be unwieldy and less than desirable to wear or transport.

BRIEF DESCRIPTION OF THE DRAWINGS

The present disclosure is illustrated by way of example, and not by way of limitation, in the figures of the accompanying drawings, in which.

DETAILED DESCRIPTION

The subject matter disclosed herein generally relates to eyewear, and more specifically to electronics-enabled eyewear with near-field communication or inductive battery charging components.

One aspect of this disclosure is an eyewear article with onboard electronics configured with an antenna for near-field communication (NFC) and/or wireless inductive charging. Such eyewear may include one or more cameras, indicator lights, memory, control circuitry, battery elements, and wireless communication circuitry in addition to the NFC and/or wireless charging circuitry that uses the near-field antenna. In order to efficiently use the space available within or on the surface of the glasses, the near-field antenna is positioned around a lens area of the frame. Because of the loop structure of the near-field antenna, the placement of the antenna loop(s) of the near-field antenna around the lens or eyepiece structure of the eyeglasses frame makes efficient use of the available space. Additionally, placement of an antenna on or near a surface of glasses around a lens area positions the antenna where circuitry or other material is not present to block the radiation for the antenna. Further, while various embodiments include the antenna for near NFC and wireless charging, the same antenna structure may additionally be used for RF communications, such as wireless network communications (e.g. WiFi or WLAN), or global positioning system (GPS) communications.

Switching circuitry present in some embodiments enables different circuitry for NFC and wireless inductive charging to be coupled to the near-field antenna around the lens area. In some such embodiments, this switching circuitry is part of a hinge structure connecting the eyewear temple with the eyewear frame that includes the lens area and the surrounding near-field antenna.

In some embodiments, eyeglasses may include near-field antenna structures around either or both lens areas in the frame, and circuitry for various functions of the eyeglasses may be embedded in the frame or in either temple of the eyeglasses. Such additional functionality may include any combination of image capture, display presentation via a screen or display integrated with the eyeglasses, wireless communications via wireless local area network or Bluetooth™ communications, NFC communications, wireless inductive battery charging, or any other such functions described herein.

NFC communications and wireless charging are, in some embodiments, particularly designed as part of a system including a case with a matching near-field antenna. In various embodiments, the case is structured to position the glasses to enable NFC data transfer or wireless charging while the eyeglasses are within an eyeglasses case by matching the position of the near-field antenna in the eyewear with a corresponding near-field antenna within the eyeglasses case.

Figure 1A:
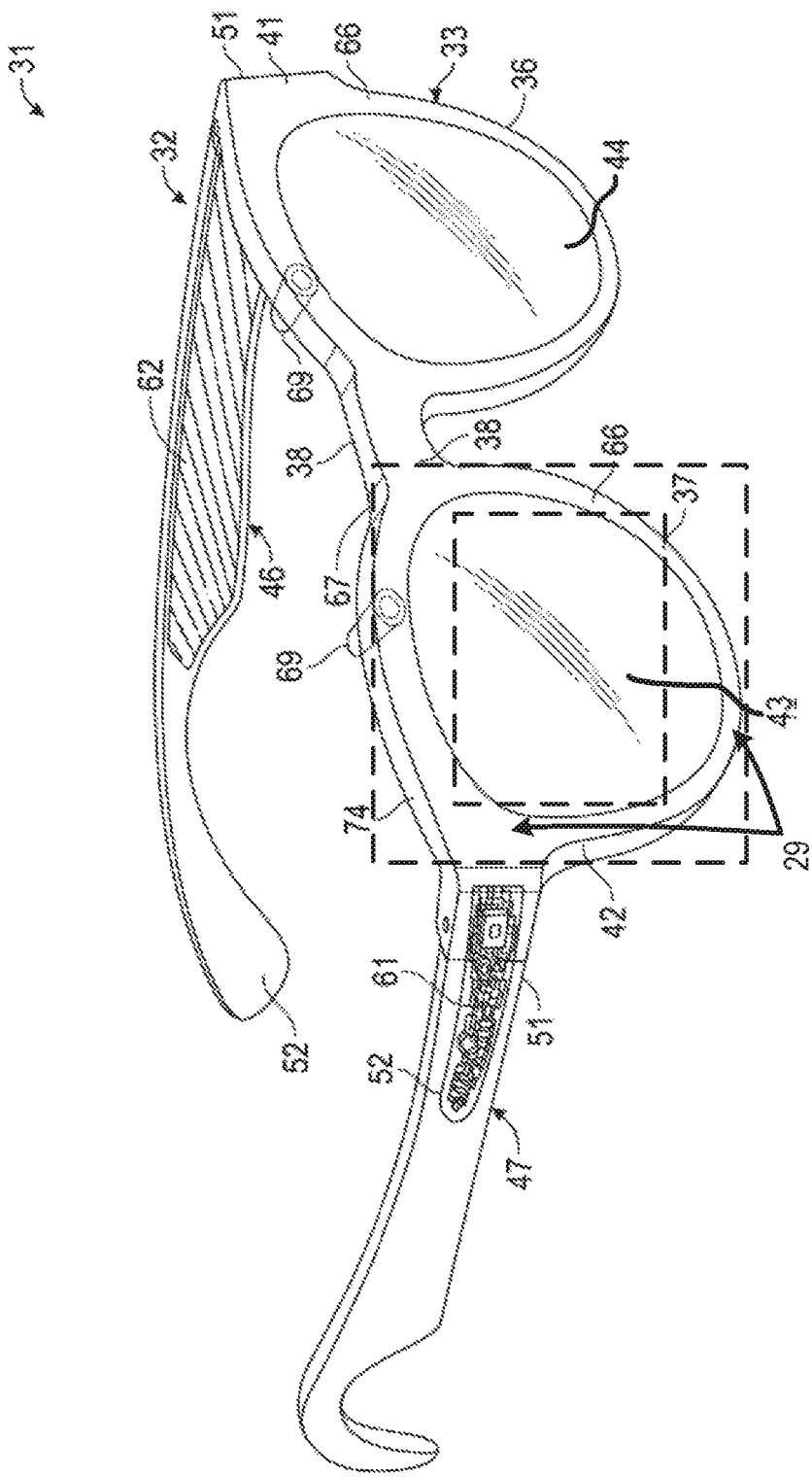
FIG. 1A illustrates eyewear with electronics in accordance with some embodiments described herein.

FIG. 1A illustrates eyewear with electronics in accordance with some embodiments described herein. The figure includes a front perspective view of glasses 31 which, in accordance with this example embodiment, includes various electronic circuit elements. Additionally, at least one area of glasses 31 around one of the eyepiece areas is used for a near-field antenna. In FIG. 1A, a first area 29 around lens area 43 is used for a near-field antenna. In various embodiments, the near-field antenna in first area 29 may be an antenna on the surface of the glasses 31, or may be embedded inside the frame 32 of glasses 31. In other embodiments, the antenna may be disposed around the other lens area 44 (e.g., around the left eye opening instead of the right eye opening) or glasses 31 may include antenna elements around both lens areas 43, 44 (e.g., both the left and right eye openings) in some embodiments. In some embodiments, a single lens area or visor area is present in place of separate lens areas for a left and right eye. In such embodiments, a near-field antenna may surround the single lens or visor area. In various embodiments, an antenna in first area 29 may be used for NFC communications or in transferring image data from a camera 69 included in glasses 31. In other embodiments, a near-field antenna in first area 29 may be used to receive a charge via inductive wireless charging from a charge source. In some embodiments, both NFC communications and wireless inductive charging are supported. Additional aspects of wireless antennas and various communication and wireless charging elements are described below.

The glasses 31 can include a frame 32 made from any suitable material such as plastic or metal, including any suitable shape of memory alloy. The frame 32 can have a front piece 33 that can include a first or left lens, display, or optical element holder 36 and a second or right lens, display, or optical element holder 37 connected by a bridge 38. The front piece 33 additionally includes a left end portion 41 and a right end portion 42. A first or left optical element in lens area 43 and a second or right optical element in lens area 44 can be provided within respective left and right optical element holders 36, 37. Each of the optical elements in lens areas 43, 44 can be a lens, a display, a display assembly, or a combination of the foregoing. As described above, a near-field antenna may be placed on the surface of any such elements or within the frame 32 using pieces molded to include an antenna on the inside, or any other such structure for disposing a near-field antenna around a lens area. In some embodiments, for example, the glasses 31 are provided with an integrated near-eye display mechanism that enables, for example, display to the user of preview images for visual media captured by cameras 69 of the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece 33 so as to be integral with the front piece 33. Each of the temple pieces 46 and 47 can include a first portion 51 that is coupled to the respective end portion 41 or 42 of the front piece 33 and any suitable second portion 52, such as curved or arcuate piece, for coupling to the ear of the user. In one embodiment the front piece 33 can be formed from a single piece of material, so as to have a unitary or integral construction. In one embodiment, such as illustrated in FIG. 1A, the entire frame 32 can be formed from a single piece of material so as to have a unitary or integral construction.

Glasses 31 can include a computing device, such as electronic components 61, which can be of any suitable type so as to be carried by the frame 32 and, in one embodiment of a suitable size and shape, so as to be at least partially disposed in one of the temple pieces 46 and 47. In one embodiment, as illustrated in FIG. 1A, the electronic components 61 is sized and shaped similar to the size and shape of one of the temple pieces 46, 47 and is thus disposed almost entirely if not entirely within the structure and confines of such temple pieces 46 and 47. In one embodiment, the electronic components 61 can be disposed in both of the temple pieces 46, 47. The electronic components 61 can include one or more processors with memory, wireless communication circuitry, and a power source. The electronic components 61 comprises low-power circuitry, high-speed circuitry, and a display processor. Various other embodiments may include these elements in different configurations or integrated together in different ways. Additional details of aspects of electronic components 61 may be implemented as described with reference to the description that follows.

The electronic components 61 additionally includes a battery 62 or other suitable portable power supply. In one embodiment, the battery 62 is disposed in one of the temple pieces 46 or 47. In the glasses 31 shown in FIG. 1A, the battery 62 is shown as being disposed in left temple piece 46 and electrically coupled using connection 74 to the remainder of the electronic components 61 disposed in the right temple piece 47. The one or more input and output devices can include a connector or port (not shown) suitable for charging a battery 62 accessible from the outside of frame 32, a wireless receiver, transmitter or transceiver (not shown), or a combination of such devices.

Glasses 31 include digital cameras 69. Although two cameras 69 are depicted, other embodiments contemplate the use of a single or additional (i.e., more than two) cameras. For ease of description, various features relating to the cameras 69 will further be described with reference to only a single camera 69, but it will be appreciated that these features can apply, in suitable embodiments, to both cameras 69.

In various embodiments, glasses 31 may include any number of input sensors or peripheral devices in addition to cameras 69. Front piece 33 is provided with an outward facing, forward-facing, or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as the cameras 69 that can be mounted on or provided with the outer surface 66 of the front piece 33 or elsewhere on the frame 32 so as to be facing away from the user. Such sensors, peripheral devices, or peripherals can additionally include biometric sensors, location sensors, accelerometers, or any other such sensors.

The glasses 31 further include an example embodiment of a camera control mechanism or user input mechanism comprising a camera control button mounted on the frame 32 for haptic or manual engagement by the user. The control button provides a bi-modal or single-action mechanism in that it is disposable by the user between only two conditions, namely an engaged condition and a disengaged condition. In this example embodiment, the control button is a pushbutton that is by default in the disengaged condition, being depressable by the user to dispose it to the engaged condition. Upon release of the depressed control button, it automatically returns to the disengaged condition.

In other embodiments, the single-action input mechanism can instead be provided by, for example, a touch button comprising a capacitive sensor mounted on the frame 32 adjacent its surface for detecting the presence of a user's finger, to dispose the touch-sensitive button to the engaged condition when the user touches a finger to the corresponding spot on the outer surface of the frame 32. It will be appreciated that the above-described push button and capacitive touch button are but two examples of a haptic input mechanism for single-action control of the camera 69, and that other embodiments may employ different single-action haptic control arrangements.

Figure 1B:
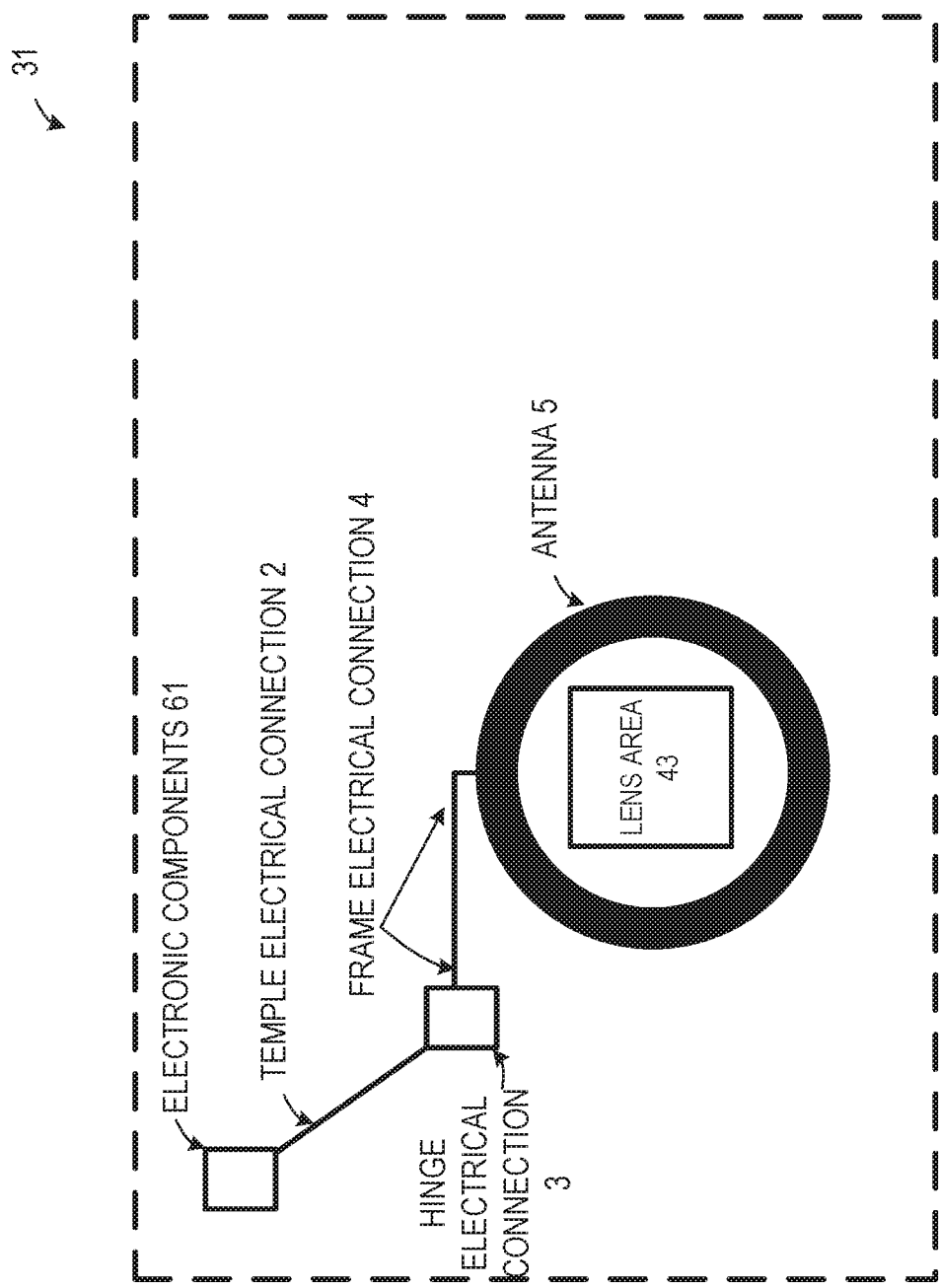
FIG. 1B illustrates aspects of eyewear with electronics and a near-field antenna in accordance with some embodiments described herein.

FIG. 1B illustrates aspects of eyewear with electronics and a near-field antenna in accordance with some embodiments described herein. FIG. 1B illustrates one implementation of glasses 31 with an antenna 5 that is implemented in first area 29, with the antenna 5 encircling lens area 43. Antenna 5 is shown as a circular antenna, but in various embodiments may be an acceptable shape for near-field communication or wireless charging, and the illustration is shown to generally present the antenna 5 around lens area 43, but does not represent a specific electronic component layout. Antenna 5 is electrically connected to electronic components 61 by frame electrical connection 4, hinge electrical connection 3, and temple electrical connection 2. In various embodiments, these connections may consist of simple conductive lines or wires attached to or embedded within the various portions of the glasses 31. In other embodiments, these may include more complicated structures, such as matching networks, control and/or frequency conversion circuitry, or any other such components to enable the use of antenna 5.

Figure 1C:
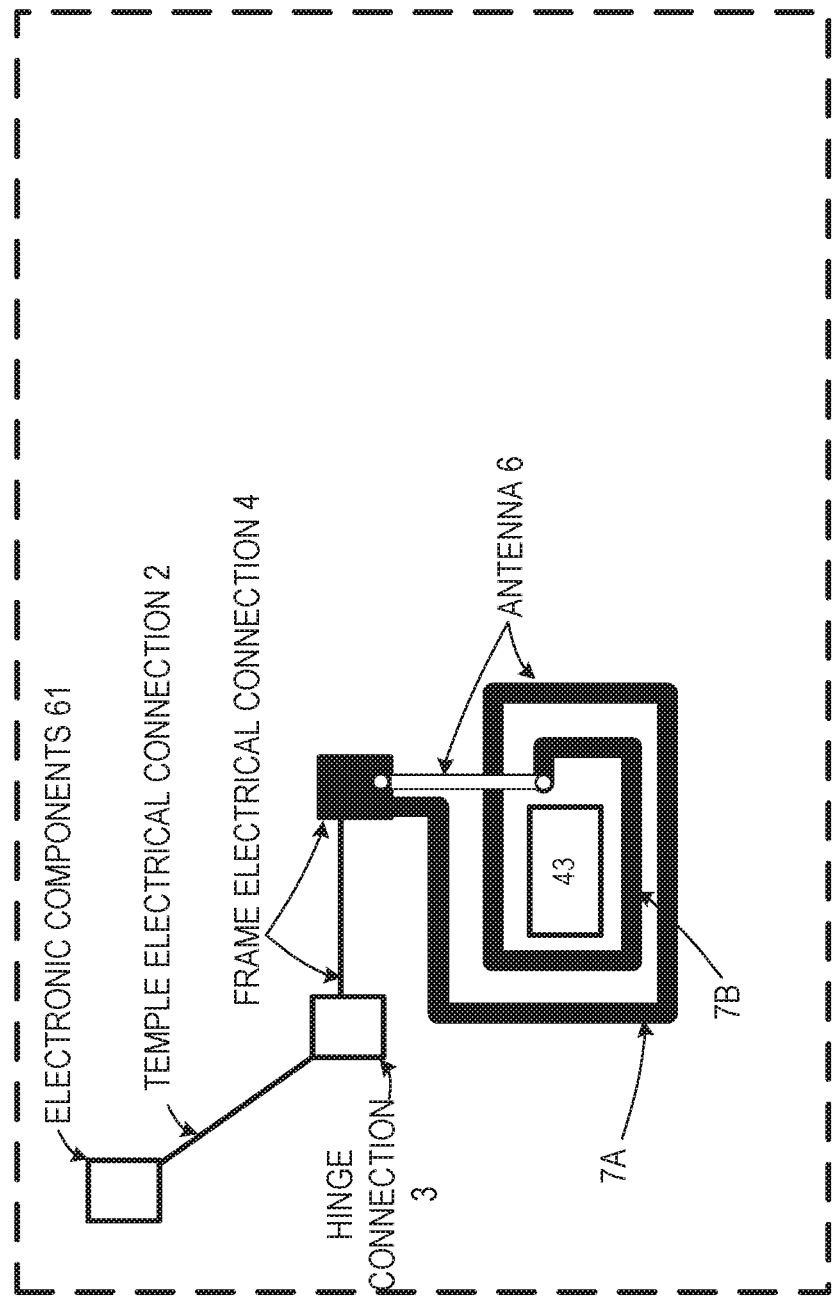
FIG. 1C illustrates aspects of eyewear with electronics and a near-field antenna in accordance with some embodiments described herein.

FIG. 1C illustrates additional aspects of eyewear with electronics and a near-field antenna in accordance with some embodiments described herein. As mentioned above, glasses 31 includes an antenna 6 within first area 29, and various antenna designs may be used in different implementations. Antenna 5 of FIG. 1B illustrates a circular single loop antenna. Antenna 6 of FIG. 1C illustrates an antenna with linear elements connected in a multi-turn spiral. Just as with antenna 5, antenna 6 surrounds lens area 43, and is connected to electronic components 61 via frame electrical connection 4, hinge electrical connection 3, and temple electrical connection 2. Antenna 6 includes multiple spiral loops, including a first loop 7A and a second loop 7B. In various other embodiments, antennas with any number of loops may be used based on the width and shape of the conductive antenna lines and the space available in or on the particular surface of the frame 32 of glasses 31. Antenna 6 may operate with multiple loops by having different sections of antenna 6 on different layers or sides of glasses 31, such that one portion of antenna 6 may cross under another portion to connect both ends of the loop to frame electrical connection 4.

Figure 1D:
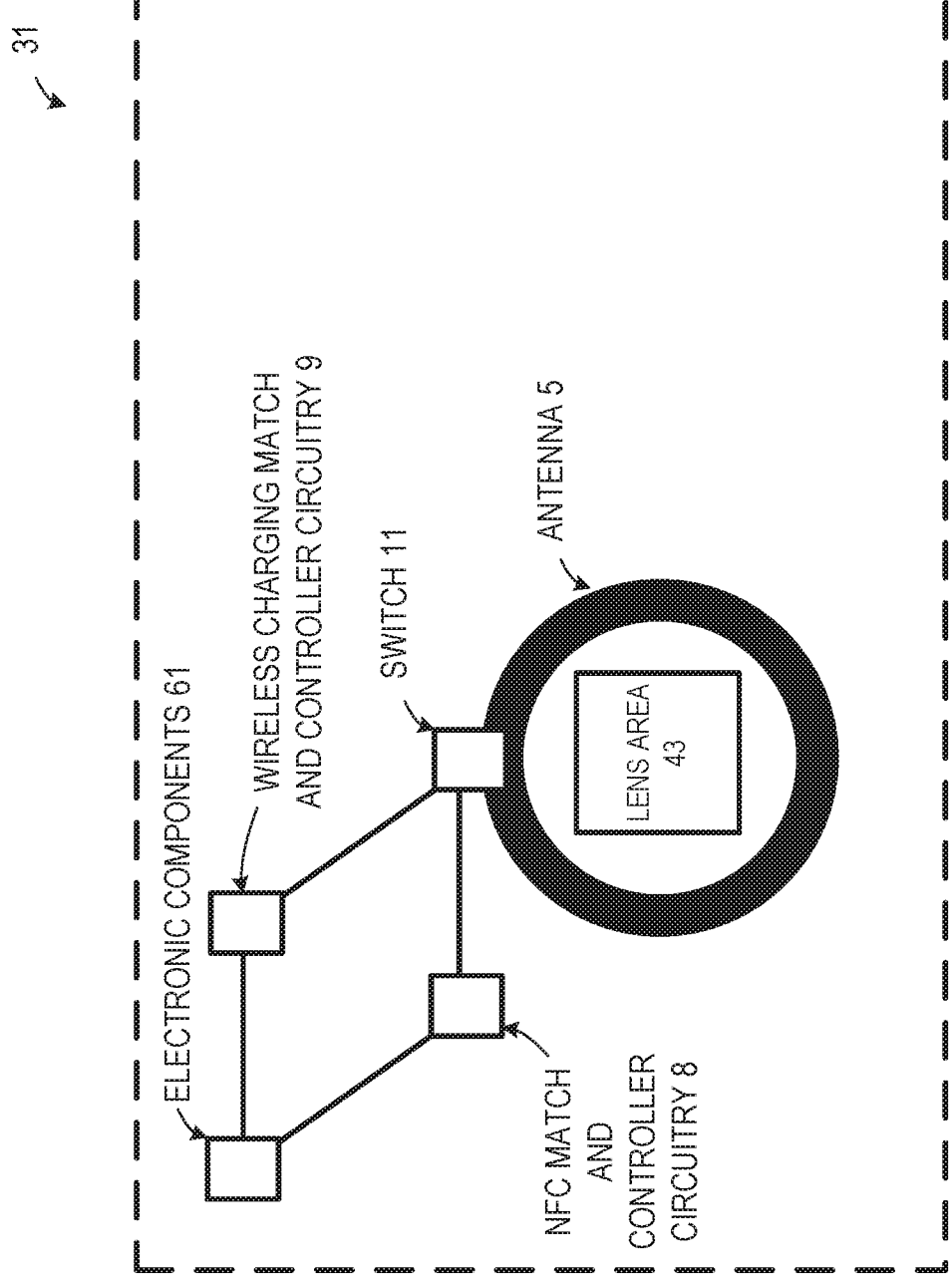
FIG. 1D illustrates aspects of eyewear with electronics and a near-field antenna in accordance with some embodiments described herein.

FIG. 1D illustrates aspects of eyewear with electronics and a near-field antenna in accordance with some embodiments described herein. Glasses 31 of FIG. 1D illustrate an additional implementation with an antenna used for both NFC and wireless charging. While NFC and wireless charging may, in some embodiments such as the one illustrated by FIG. 1D, use the same antenna, certain match and controller circuitry may be different In FIG. 1D, switch 11 is used to connect different components for different operations to antenna 5, which is an antenna structured around the lens area 43, as detailed above. Electronic components 61 may, in some embodiments, include one or more processors with control circuitry that electronically manage switch 11 and the scheduling and operation of the separate NFC and wireless charging components. In other embodiments, an input such as a button or physical switch may control the electronic switch 11 to determine which components are directly connected to antenna 5. In some such embodiments, the use of different contacts in a hinge as part of hinge electrical connection 3 may be used to select between NFC match and controller circuitry 8 and wireless charging match and controller circuitry 9, such as the connections described below with respect to FIGS. 4A and 4B.

For NFC operations. NFC match and controller circuitry 8 is connected to antenna 5 via switch 11 and wireless charging match and controller circuitry 9 is disconnected from antenna 5. For wireless charging operations, wireless charging match and controller circuitry 9 is connected to antenna 5 via switch 11, and NFC match and controller circuitry 8 is disconnected from antenna 5. Separate matching circuits are used due to the different frequency and power requirements of the different NFC and wireless charging functions. In certain embodiments, these operational details are defined by standards and regulations. For example, NFC technology may be based on operations defined by international standards organization standard 14443 to facilitate interoperability. Additionally, the data functions implemented using NFC also may use significantly different processing operations than the wireless charging functions. Payments using NFC technology, for example, may use specialized controller circuitry to implement details of secure payments as part of technologies like Apple Pay™ and Android Pay™. These and other technologies supported within controller circuitry attached to an antenna enable use of corresponding payment terminals in conjunction with implementations of glasses 31 that include support for NFC payment.

While the embodiment of FIG. 1D uses a switch 11 to isolate antenna 5 from the different circuitry implementing different operations using the antenna 5, in other embodiments, separate antenna and circuitry may be provided for each function. For example, in an alternate embodiment, one lens area may be surrounded by a first antenna connected to NFC match and controller circuitry 8 and a second lens area may be surrounded by a second antenna separately connected to wireless charging match and controller circuitry 9.

Additionally, while particular antenna structures are described above and throughout this document, additional structures configured to implement the functions described herein may also be used. Some such antenna structures compatible with the eyewear described herein may, in addition to operating for NFC and wireless charging, be used for higher frequency or radio frequency (RF) communications such as WiFi or GPS communications. Some such devices may include a diplexer or other such multiplexer to electrically separate the various communication systems, and to enable the antenna to function for multiple different communication operations including NFC and RF communications.

Figure 2:
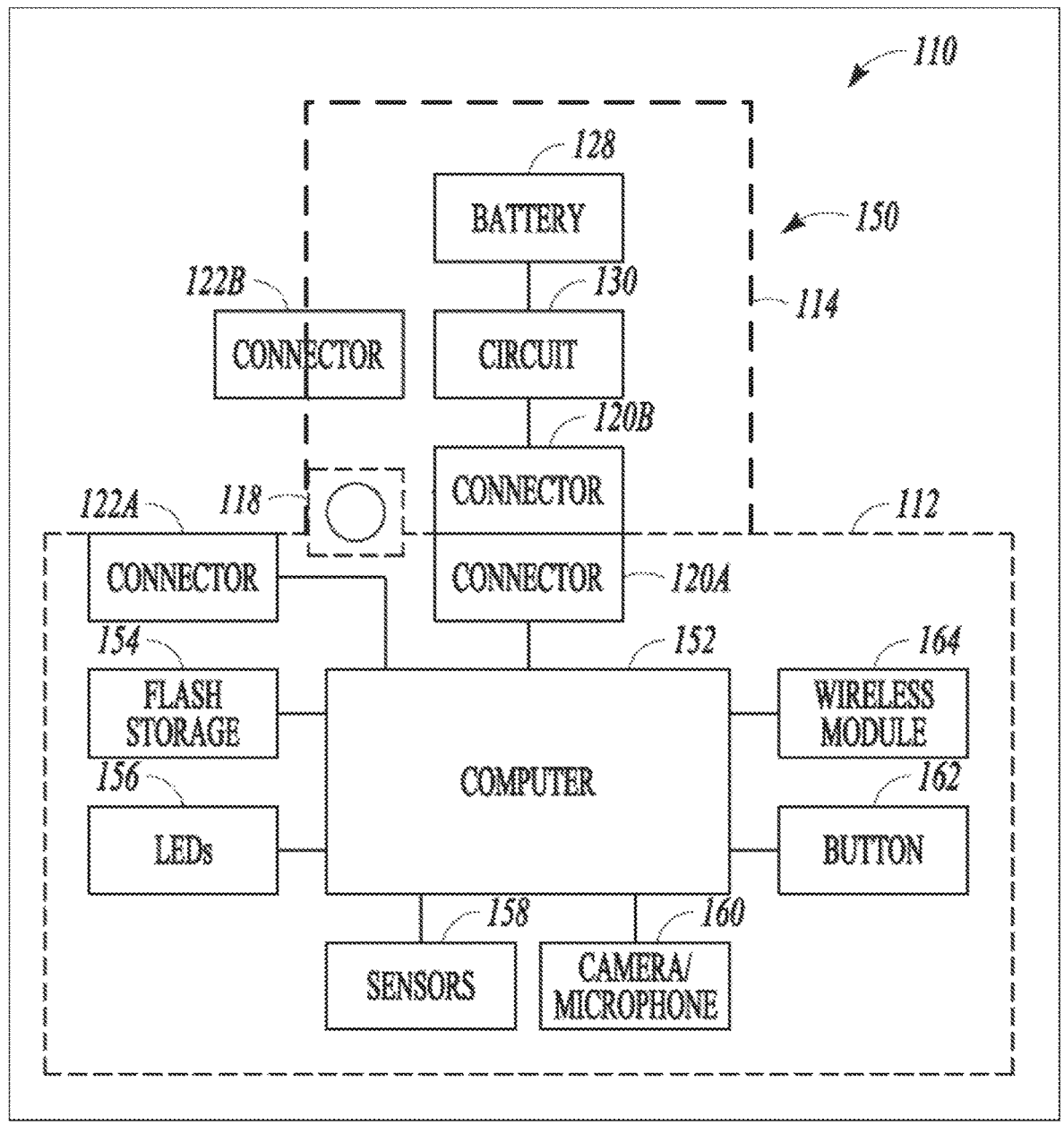
FIG. 2 illustrates aspects of eyewear with electronics and a wireless module with a near-field antenna in accordance with some embodiments described herein.

FIG. 2 illustrates aspects of eyewear with electronics and a wireless module with a near-field antenna in accordance with some embodiments described herein.

FIG. 2 is a schematic of glasses 110 that incorporate various aspects of the eyewear previously discussed but may differ therefrom. In some embodiments, glasses 110 may be an embodiment of glasses 31. The glasses 110 can be configured to electrically couple in a first position and a second position as a hinge connecting a temple and frame is adjusted. The glasses 110 can be constructed in a manner similar to glasses previously discussed, and thus can include two temples (only one temple 114 is illustrated in FIG. 2) and a frame 112. According to the embodiment illustrated in FIG. 2, the glasses 110 comprise smart glasses which carry electronics 150. Electronics 150 includes multiple elements, including at least a battery 128 and a wireless module 164 that includes a near-field antenna such as antenna 5 or antenna 6 discussed above, as well as any match and controller circuitry (e.g., NFC match and controller circuitry 8) for the supported wireless operations. Computer 152 includes one or more processors that manage the wireless operations as well as other functions of glasses 110 such as image capture using a camera/microphone 160, or other functions. In various other embodiments, different combinations of operations involving different output elements, sensors elements, and any other such element may be present and controlled by one or more processors of a computer 152.

The frame 112 and temple 114 can be provided with complimentary connectors 120A, 120B, 122A, 122B configured to electrically and physically couple with one another as generally illustrated. The connectors 120A, 120B, 122A, 122B can be disposed adjacent the hinge joint assembly or can be incorporated into the hinge joint assembly. In some cases, the connectors 120A, 120B, 122A, 122B can be disposed at other portions of the frame 112 and temple 114 from the locations previously discussed with reference to FIGS. 1A-1D.

The smart glasses 110 of FIG. 2 can include various electronics 150. For example, the temple 114 can be configured to carry and/or house a battery 128 and a circuit 130, such as a protection circuit, in addition to the connectors 120B and 122B. The battery 128 is configured to operationally store charge. The circuit 130 is coupled to the battery 128 (and to the connectors 120B and 122B) and is configured to deliver the charge to and from the battery 128.

The frame 112 can be configured to carry and/or house further electronics 150 such as a computer 152, a memory 154 (e.g., flash storage), a display 156 (e.g., LCD. LED, and the like), a sensor 158, a camera/microphone 160, a capture device 162 (e.g., a button), and a wireless module 164. Although not illustrated, the temple 114 and/or frame 112 can carry further electronics 150 in some instances such as further sensors, ancillary batteries, peripheral devices, or other peripherals.

Many if not all of the electronics 150 run software and perform other tasks that require electrical charge from the battery 128. Thus, the ability to provide charge from the battery 128 to the electronics 150 carried by the frame 112 when the glasses 110 are in the folded position (in addition to the wearable position) allows software and/or tasks to be performed even when the glasses 110 are stowed. Therefore, performance of the glasses 110 and user experience can be improved as software can run and tasks can be performed even when the glasses 110 are stowed. According to some examples, moving the temple 114 to the folded position can put the electronics 150 in a low power mode of operation where sufficient power is provided to the electronics 150 such that software and other tasks can be performed by one or more of the electronic devices, but excessive power is not utilized. Thus, battery life can be preserved even as software and tasks are performed when the glasses 110 are in the folded position.

In other embodiments, different circuitry can be connected depending on the position of a hinge. For example, a connector 122B may connect to NFC match and controller circuitry while connector 120B connects to wireless charging match and control circuitry and an associated battery 128 to be charged. In other embodiments, combinations of mechanical connectors and electronic switches may be used to connect different circuitry to a near-field antenna within wireless module 164. In such embodiments, different placement of processors/computer 152 and wireless module 164 may be used, with switches and connectors between the different battery 128, processor/computer 152, and wireless module 164 elements.

As shown in FIG. 2 the connectors 120A, 120B and 122A, 122B, respectively are adapted to interface and couple together to form conductive coupling mechanism 118 capable of passing electrical charge. The computer 152 can be of any suitable type (e.g., make use of a low-power circuitry, high-speed circuitry, and/or a display processor) to be carried by the frame 112 and can communicate with the other electronics 150. The computer 152 can include one or more processors with memory, wireless communication modules and circuitry, a power source, and the like. Additional details of aspects of computer 152 may be implemented with use of the display 156, the sensor 158, the camera/microphone 160, the capture device 162 (e.g., a button), and/or other components or peripherals. Further aspects of the computer 152 may be implemented remotely via wireless, Bluetooth, or the like.

Although described as a signal unit, the camera/microphone 160 can comprise separate components or can be only a camera or only a microphone. The camera/microphone 160 can comprise multiple cameras and/or multiple microphones in some instances. The computer 110 can be configured to communicate with and/or control various of the electronics 150 such as the display 156, the sensors 158, the capture device 162, the wireless module 164 and/or other peripheral devices. The electronics 150 can additionally include a video processor (not shown) such as a microprocessor integrated circuit (IC) customized for processing sensor data from the camera/microphone 160, along with volatile memory used by the microprocessor to operate. The memory 154 can comprise any suitable storage device capable of storing data generated by the electronics 150 including the camera/microphone 160. Memory 154 can be integrated with high-speed circuitry, can be an independent standalone element, or can be remote or integrated into the glasses 110.

Figure 3A:
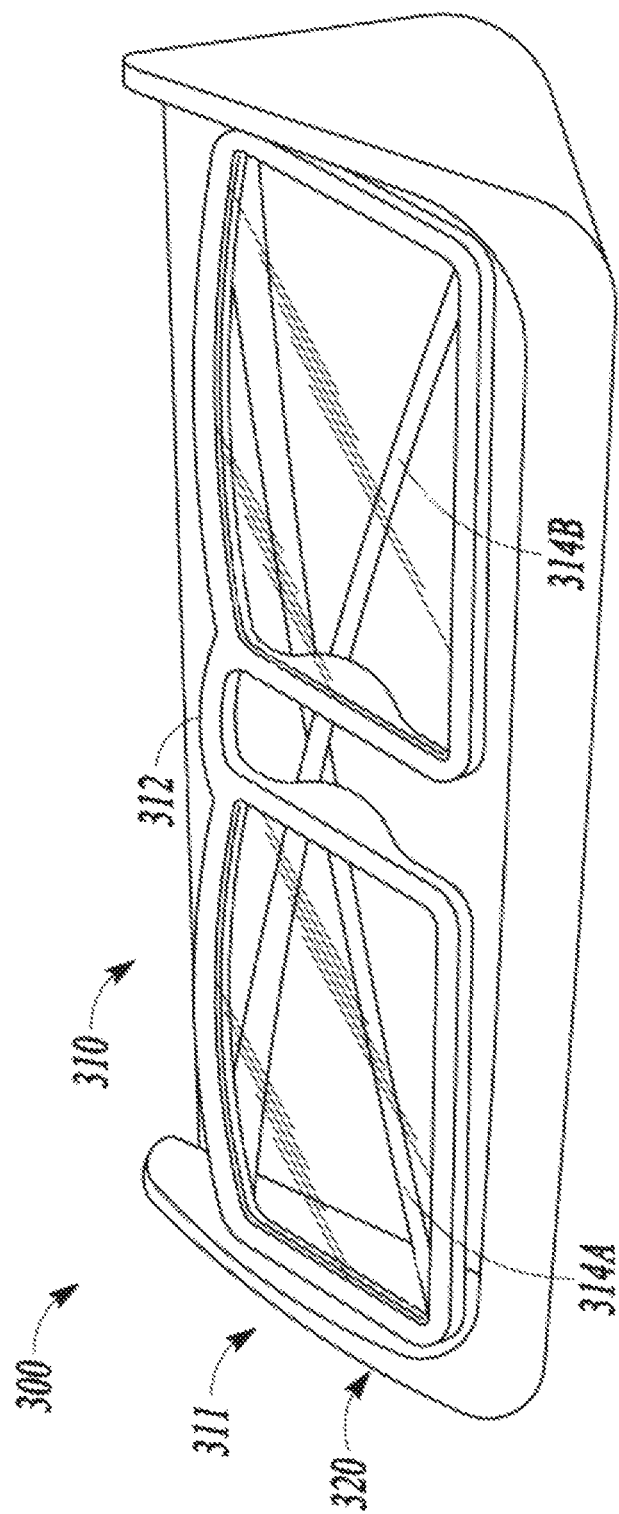
FIG. 3A is a front perspective view of a system including eyewear and a case as part of a system for near-field communications or wireless inductive charging in accordance with some embodiments.
Figure 3B:
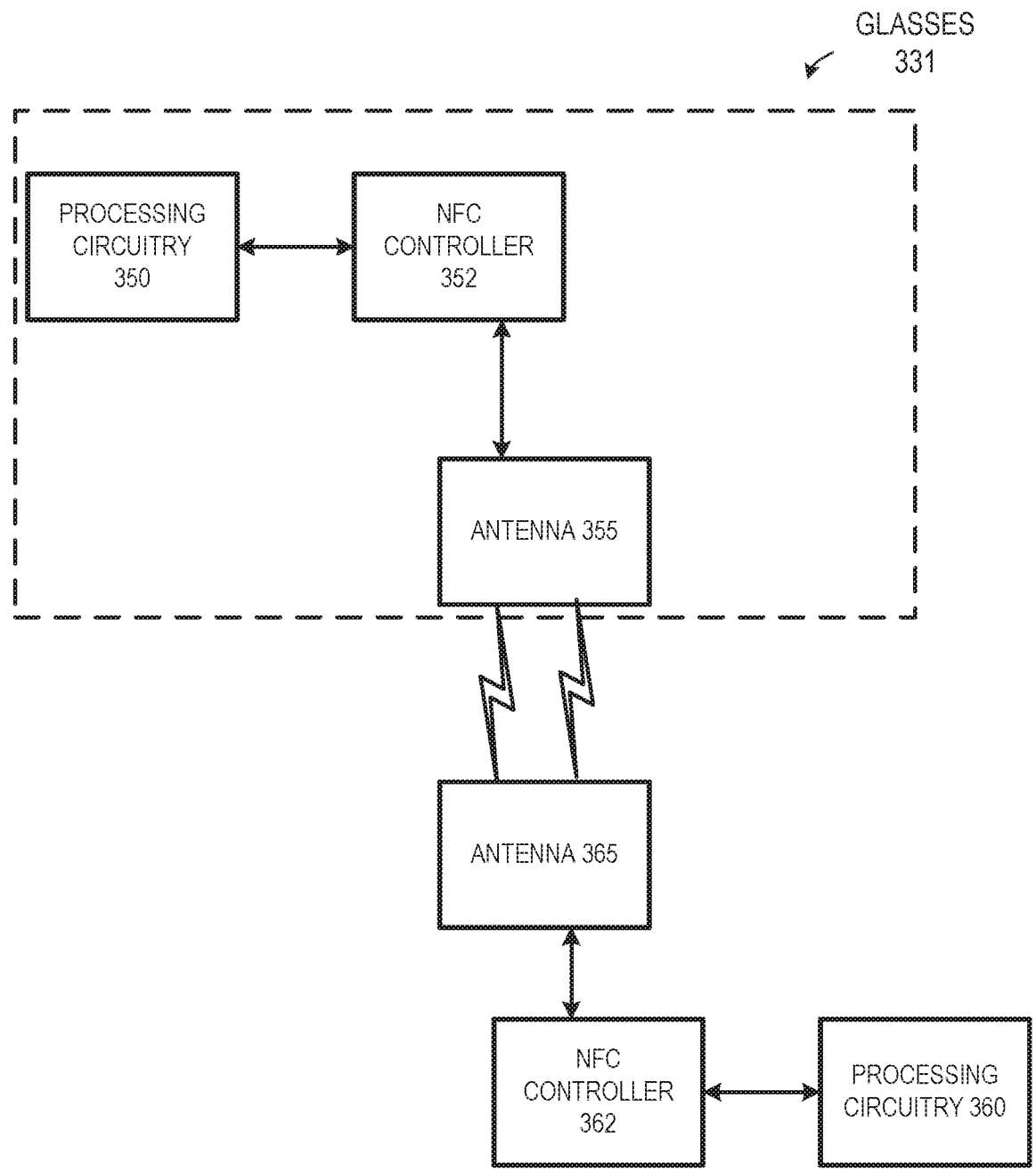
FIG. 3B illustrates aspects of a system including eyewear and a case as part of a system for near-field communications in accordance with some embodiments.
Figure 3C:
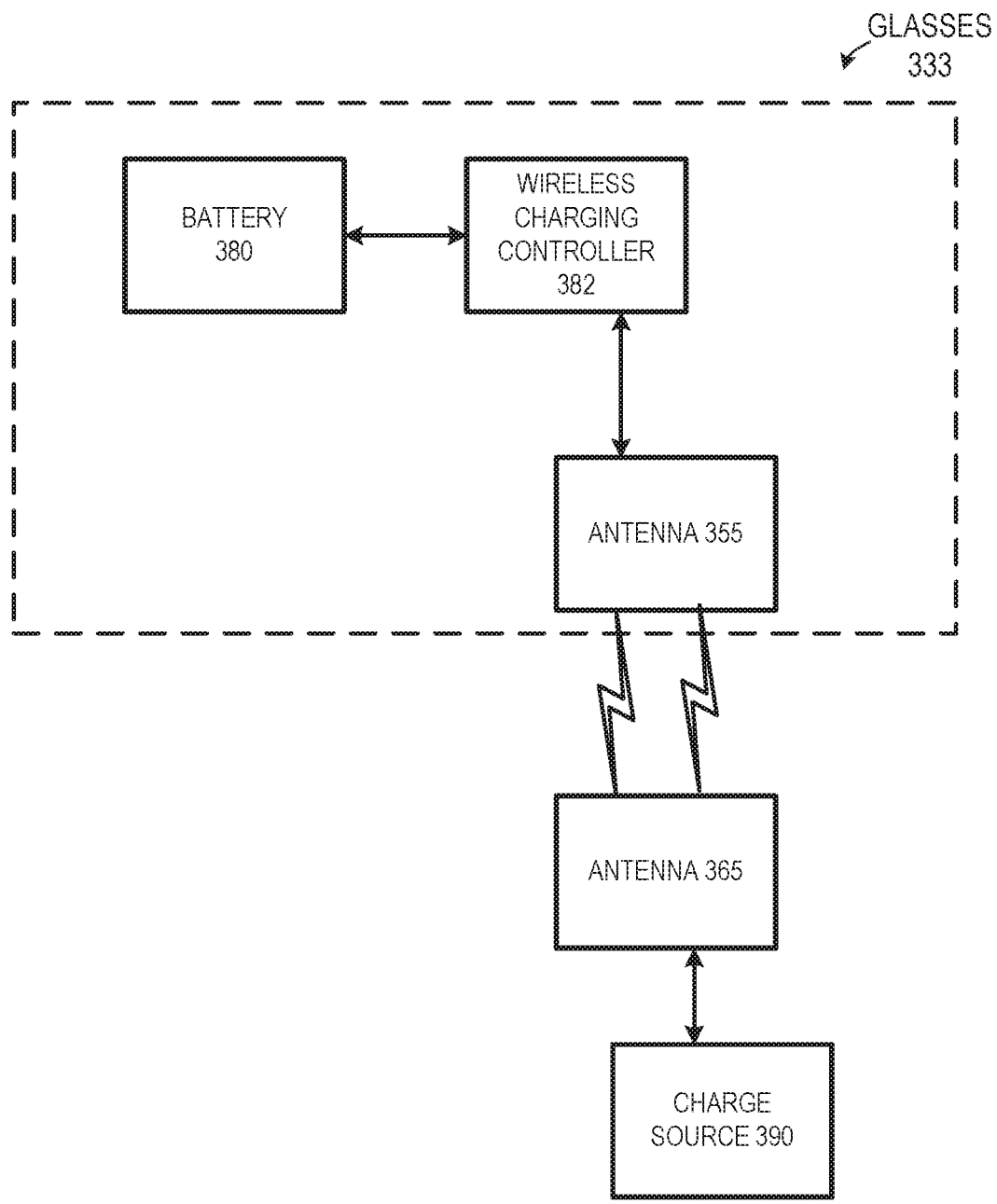
FIG. 3C illustrates aspects of a system including eyewear and a case as part of a system for inductive charging in accordance with some embodiments.

FIG. 3A is a front perspective view of a system including eyewear and a case as part of a system for near-field communications or wireless inductive charging in accordance with some embodiments. FIG. 3B illustrates aspects of a system including eyewear and a case as part of a system for near-field communications in accordance with some embodiments. FIG. 3C illustrates aspects of a system including eyewear and a case as part of a system for near-field charging in accordance with some embodiments. As detailed above, NFC and wireless charging operations use different circuitry to implement the corresponding functionality. As part of the operation using a near-field antenna on eyeglasses in accordance with embodiments described herein, another antenna is used with the antenna on the glasses.

NFC and wireless charging as described herein both work using magnetic induction. For NFC, the process works as shown in FIG. 3B. For wireless charging, the process works as shown in FIG. 3C. In the NFC embodiment of FIG. 3B, glasses 331 containing processing circuitry 350 or another device containing processing circuitry 360 operates as a reader/interrogator that sends a small electric current on a corresponding loop antenna 355 or 365. This in turn creates a magnetic field. That field is received by the other antenna in the pair, where it is turned back into electrical impulses. This process is used to communicate data such as identification number status information or any other information. NFC controller circuitry 362, 352 may implement specific communication protocols and drive the corresponding antenna 355, 365 appropriately. So-called 'passive' NFC tags use the energy from the reader to encode their response while 'active' or 'peer-to-peer' tags have their own power source and respond to the reader using their own electromagnetic fields. Like RFID, NFC works in the 13.56 MHz radiofrequency spectrum using less than 15 mA of current to communicate data over distances that are usually far less than 20 cm. In other embodiments, other frequencies and current levels may be used. Similarly, FIG. 3C describes wireless charging, with a charge source 390 providing current to antenna 365, which generates a corresponding current in antenna 355. Wireless charging controller 382 manages this current to provide a charge to battery 380.

In various embodiments, a glasses case such as that shown in FIG. 3A is used with glasses to provide either NFC communications while the glasses are in the case, wireless charging of a battery within the glasses while the glasses are in the case, or both. Thus, in accordance with embodiments described herein. NFC communications may, for example, be used to download images or other data from a memory on glasses to a memory connected to a glasses case when the glasses are in the case using NFC enabled by an antenna around a lens space of the glasses and a corresponding antenna within a case for the glasses. The case is formed, in various embodiments, to match the shape of the glasses, such that the near-field antenna of the glasses around the lens space is positioned close to an antenna within or on a surface of the glasses case to provide magnetic coupling as described above. Such coupling has the benefit of not requiring exact contact like a physical contact for electrical coupling, though better magnetic coupling does provide increased efficiency. The magnetic coupling instead provides a simpler coupling when the glasses are within the case, as well as options for communicating or charging using any terminals sufficiently well matched to the antenna of the glasses for magnetic coupling, which may be less complex than the physical structures of different electrical connectors.

FIG. 3A illustrates a smart eyewear kit 300 including, for example, a pair of smart glasses 310 and a container or holder such as a case 311. As detailed above, glasses 310 and case 311 include near-field antennas matched to enable magnetic coupling for NFC, wireless charging, or both. As discussed with regard to previous embodiments, the glasses 310 can generally include a frame 312, temples 314A and 314B, and electronics (as illustrated and discussed in previous embodiments); the details of each will not be discussed in great detail as aspects of these items have been previously described. The case 311 and glasses 310 can include electrical connectors 320 in the example form of a base or internal connector or port on the case 311 that enables power to be delivered to the glasses 310 via then magnetic coupling, or data to be offloaded from the phone glasses 310 via the case 311.

As illustrated, the glasses 310, the case 311, and near-field antennas of the glasses 310 and case 311 as aligned for magnetic coupling can interact together in various ways and for various purposes. For example, the antennas are configured for power and/or data communications, and case 311 can be used to transport and protect the glasses 310, to charge or provide power to the electronics (including the battery housed in the temple 314A) incorporated in the glasses 310, and/or to communicate with the electronics of the glasses 310 to a backup memory of case 311. Thus, in some embodiments, the case 311 can house a supplemental battery to those of the glasses 310 and/or supplemental storage memory.

In some embodiments, electrical connections within the hinge connect frame 312 and the temples 314A and 314B such that they are connected only in a folded position.

Figure 4A:
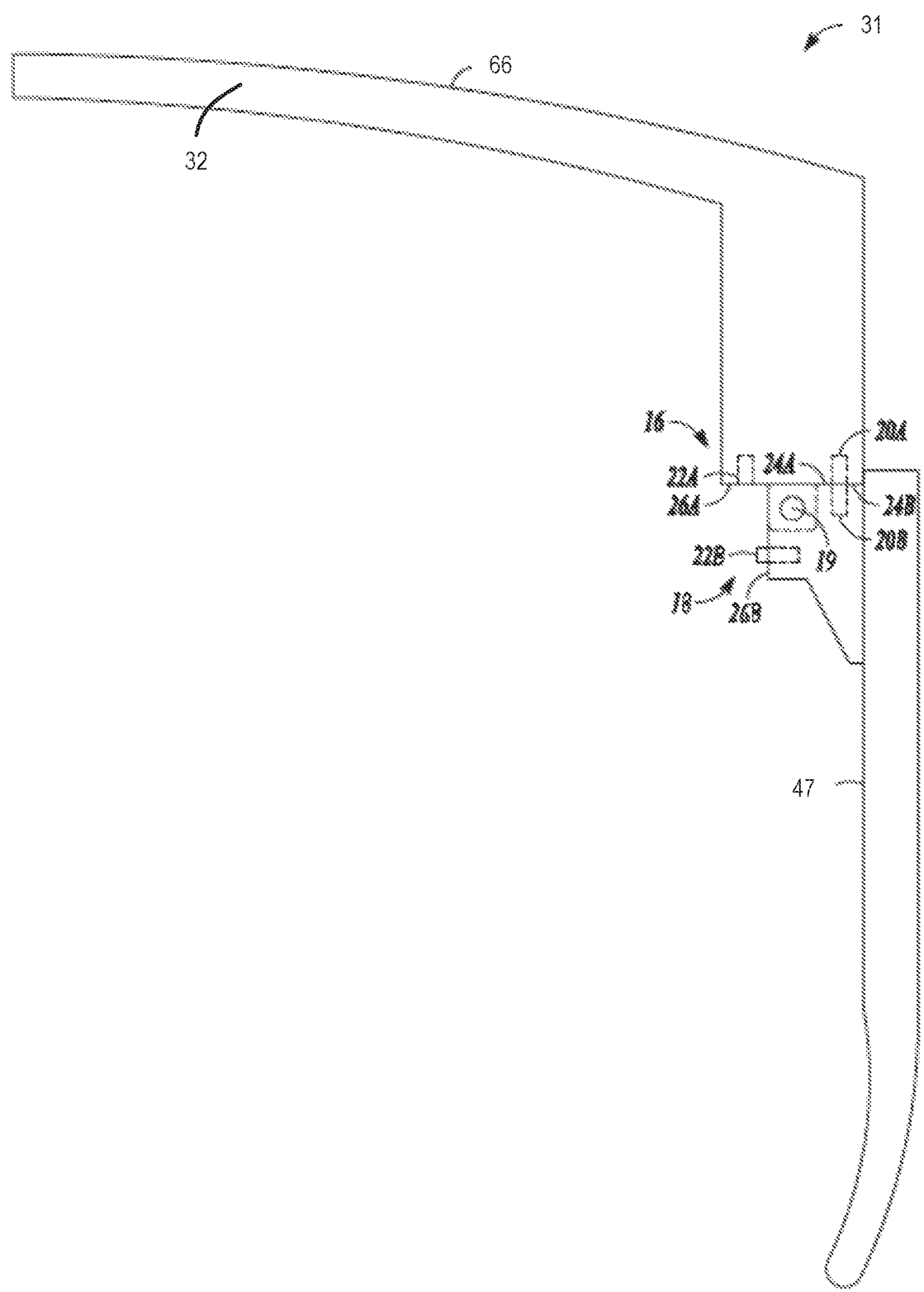
FIG. 4A is a top view of a right temple and half of a frame of eyewear, along with a hinge joint for electronic coupling of the frame and the temple, in accordance with some embodiments.
Figure 4B:
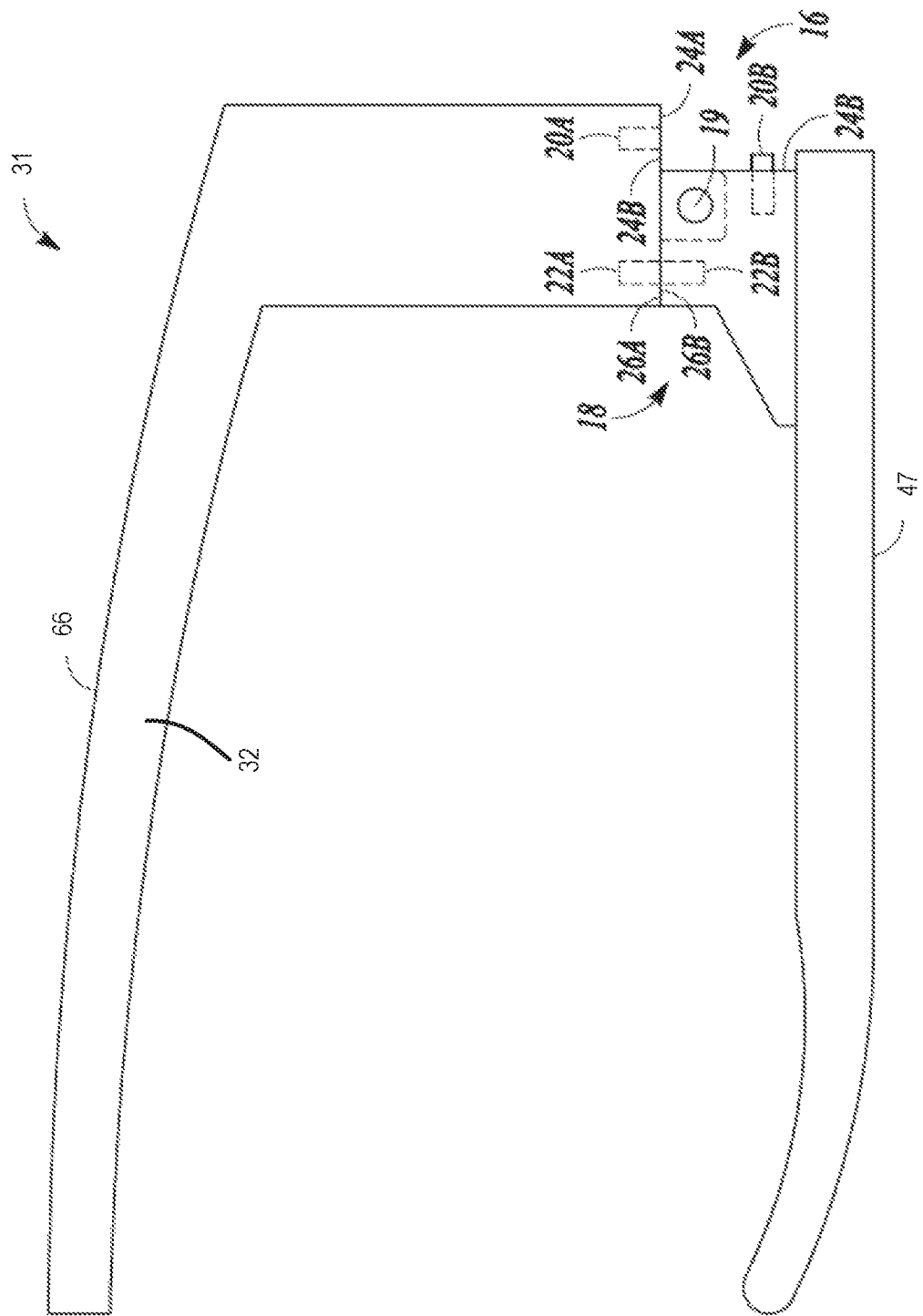
FIG. 4B is a top view of a right temple and half of a frame of eyewear, along with a hinge joint for electronic coupling of the frame and the temple, in accordance with some embodiments.

FIGS. 4A and 4B then illustrate aspects of a conductive hinge that may be used, in some embodiments, to connect a near-field antenna around a lens area of a frame with electronic components in a temple portion of eyewear. FIG. 4A is a top view of a right temple and half of a frame of eyewear, along with a hinge joint for electronic coupling of the frame and the temple, in accordance with some embodiments. As described above, this may enable certain functionality, such as wireless charging, only when the temples of the glasses are in a folded position. In other embodiments, other connections may be used, or such hinge joints may be used along with electronic switches for enabling and disabling certain circuit elements and controllers that enable NFC and/or wireless charging functionality. FIG. 4B is a corresponding top view of a right temple and half of a frame of eyewear, along with a hinge joint for electronic coupling of the frame and the temple, in accordance with some embodiments. In FIGS. 4A and 4B, the eyewear article includes a conductive coupling mechanism (e.g., an interface or port) that allows power from a battery in the temple to be provided to the onboard electronics in the frame when the temple is in a wearable configuration (e.g., FIG. 4A) and when the eyewear article is in a folded or collapsed configuration (e.g., FIG. 4B). Such configuration allows the onboard electronics to be supplied with power in either the wearable configuration or folded configuration. This allows the eyewear article to be operable even in the folded configuration such as to run software and perform other tasks that can improve efficiency and performance, thereby improving the user experience. This, for example, enables a connection for wireless charging of a battery in a temple using a near-field antenna around a lens area in a frame when the temple is folded. Using separately connected circuitry, this could also be used to isolate NFC circuitry that is enabled when the temple is in the open position. In other embodiments, electronic switches are used to enable both NFC and wireless charging in both the open and closed position of the temple hinge. In still further embodiments, different mechanisms are used to connect temple electronics with frame electronics (e.g., the near-field antenna around a lens space).

According to further aspects, the conductive coupling mechanism of the temple can be configured to interface with and receive charge from an external power source via a near-field antenna when the eyewear article is in the folded or collapsed configuration. Such a coupling mechanism can be used for recharging of the battery of the eyewear article, for example.

The smart glasses may have a body comprising the lens-carrying frame with an antenna around at least one lens area, and a pair of the temples hingedly mounted on opposite ends of the frame. The smart glasses are, in such cases, in the wearable configuration or mode when at least one of both temples is substantially fully unfolded for reception along a side of the user's head. In contrast, the smart glasses are in the folded condition when at least one of the temples is hingedly folded towards the frame sufficiently to create the conductive coupling mechanism between a battery in the temple and onboard electronics in the frame. The folded condition thus can include both a fully folded condition in which one or both of the temples are hinged fully inwardly towards the frame (e.g., FIG. 4B), and a partially folded condition. However, in some cases the partially folded condition can break the conductive coupling mechanism between the battery (or batteries) in the temple(s) and the onboard electronics in the frame such as to power off or restart the electronics.

In some embodiments, the conductive coupling mechanism extends across (e.g., is located at) an articulated hinge joint where one of the temples is hingedly connected to the frame. The conductive coupling mechanism may be located on several of the joint faces provided by the frame and the temple respectively, the joint faces being in face-to-face abutment when in the wearable condition (see, e.g., faces 24A and 24B in FIG. 4A), and being in face-to-face abutment when in the folded condition (see, e.g., faces 26A and 26B in FIG. 4B). In other embodiments, dual conductive coupling mechanisms may be implemented one on each temple, with the conductive coupling mechanism on each temple. To facilitate the conductive coupling mechanism, the temple and the frame may carry cooperating features such as pins and pads configured for automatic contact and coupling when the smart glasses are in either the wearing condition or the folded condition, to provide a conductive coupling mechanism (and in some cases a data connection) between electronics in the temple and electronics in the frame.

In some embodiments, electrical/electronic components may be carried both by the frame and at least one of the temples. In other embodiments, the battery will be carried by one or both of the temples while substantially all other electrical/electronic components (see, e.g., computer, sensors, camera, microphone, wireless module, and the like, of FIG. 2) are carried only by the frame. This allows for a slimmer frame that can be more desirable for the user to wear and easier for the user to transport. In some such embodiments, an antenna around a lens area may be electrically connected to batteries in both temple elements, and may be used to charge both batteries. In such embodiments, a single controller may be used to manage the charging, or separate controllers for each battery or each temple may be used.

FIGS. 4A and 4B show an example embodiment of eyewear 31 comprising smart glasses from a position above the eyewear 31. As shown in the FIGS. 4A and 4B, the eyewear 31 includes a frame 32, a temple 47, a hinge joint assembly 16, and a conductive coupling mechanism 18. The conductive coupling mechanism 18 allows power from a battery in the temple 47 to be provided to the onboard electronics in the frame 32 when the temple 47 is in the wearable configuration (e.g., FIG. 4A) and when the eyewear 31 is in a folded or collapsed configuration (e.g., FIG. 4B). It should be recognized that such arrangement can be reversed in some embodiments such that the battery can be carried by the frame 32 and the onboard electronics can be carried by the temple 47. Such configurations allow the onboard electronics to be supplied with power in either the wearable configuration or folded configuration. This allows the eyewear 31 to be operable not only in the wearable configuration but also in the folded configuration such as to run software and perform other tasks.

FIGS. 4A and 4B also illustrate that the hinge joint assembly 16 can be shared between the temple 47 and the frame 32 to couple the temple 47 to the frame 32. The hinge joint assembly 16 can include a pin connection 19 that can comprise a single pin or multiple pins with different connection points between the temple 47 and the frame 32. The hinge joint assembly 16 facilitates mechanical movement of the temple 47 relative to the frame 32 about the pin connection 19. Such movement can be between the wearable configuration/position of FIG. 4A and the collapsed folded configuration/position of FIG. 4B.

According to the embodiment of FIGS. 4A and 4B, the conductive coupling mechanism 18 can be incorporated in the articulated hinge joint assembly 16 and can be configured to electrically connect the battery with other onboard electronics across the hinge joint assembly 16. As shown in FIGS. 4A and 4B, the conductive coupling mechanism 18 can include a first connector 20A positioned on a first face 24A of frame 32 and a second connector 22A positioned on a second face 26A of the frame 32. At least one of the first or second face 24A and/or 26A can comprise a portion of the hinge joint assembly 16 and/or can be disposed closely adjacent the hinge joint assembly 16. The conductive coupling mechanism 18 can also include a first connector 20B positioned on a first face 24B or portion of the temple 47 and a second connector 22B positioned on a second face 26B or portion of the temple 47. At least one of the first or second face 24B and/or 26B can comprise a portion of the hinge joint assembly 16 and/or can be disposed closely adjacent the hinge joint assembly 16. First face 24A is configured to interface with first face 24B when the temple 47 is in the wearable position. Similarly, second face 26A is configured to interface with the second face 26B when the temple 47 is in the folded position.

The conductive coupling mechanism 18 can be configured for automatic contact and electrical coupling in both the wearable position (FIG. 4A) and the folded position (FIG. 4B). More particularly, the connectors 20A and 20B are designed to interface with and electrically couple with one another such that they are complementary in design (e.g., one comprises a pad and one a pin, etc.). Similarly, the connectors 22A and 22B are designed to interface with and electrically couple with one another such that they are complimentary in design. As shown in FIGS. 4A and 4B, the connectors 20A and 22A comprise contact pads, while the connectors 20B and 22B comprise contact pins. However, the arrangement can be reversed or another known connector, for example, a port, a link, a socket, a plug, a cord, a micro-USB, or the like can be utilized.

Figure 5:
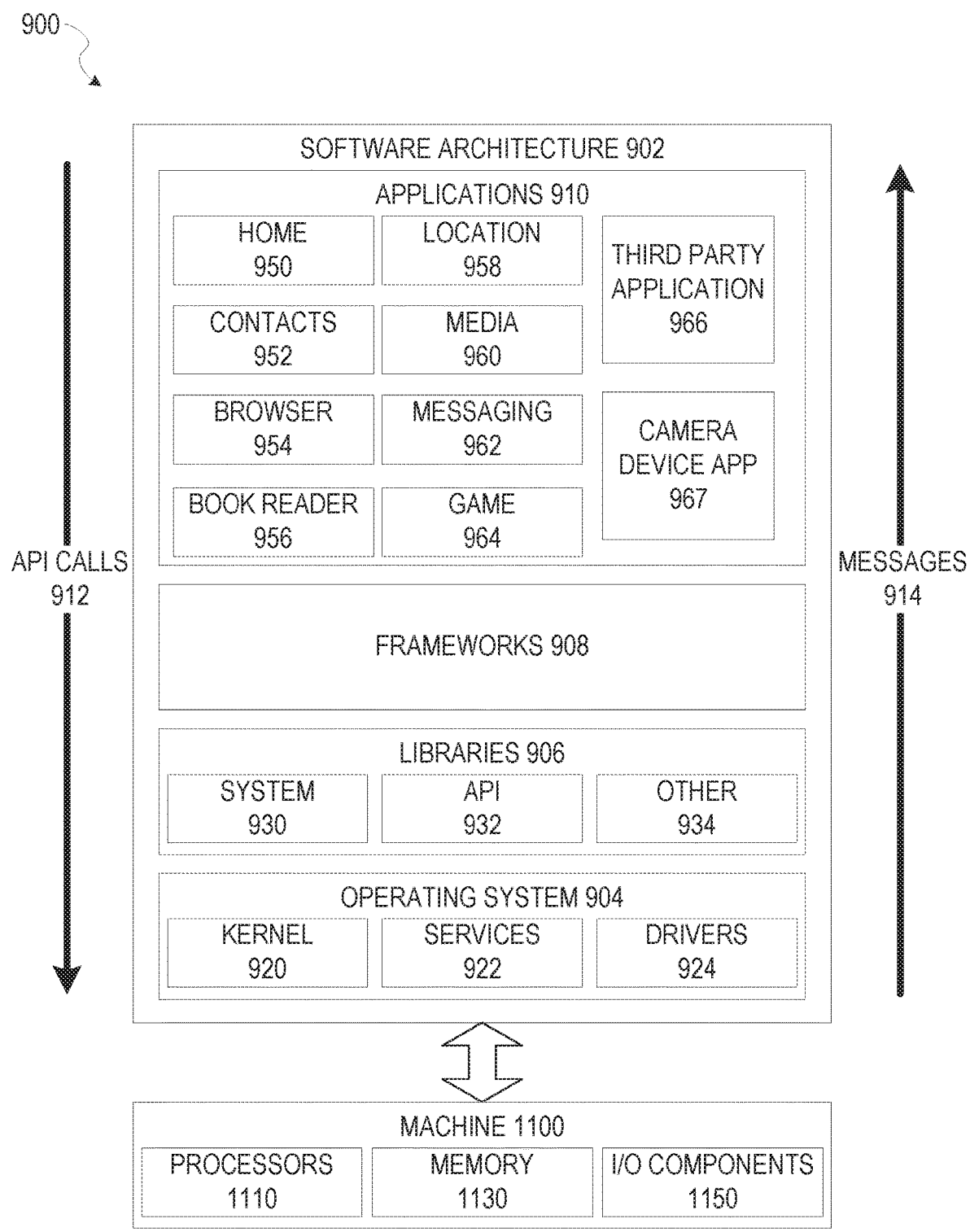
FIG. 5 is a block diagram illustrating an example of a software architecture that may be installed on a machine according to some example embodiments.

FIG. 5 is a block diagram 900 illustrating a software architecture 902, which can be installed on any one or more of the eyeglasses or an accompanying host device (e.g., smartphone), glasses case, charge source, or other system coupled to the eyeglasses. FIG. 5 is merely a non-limiting example of a software architecture 902, and it will be appreciated that many other architectures can be implemented to facilitate the functionality described herein. In various embodiments, the software architecture 902 is implemented by hardware such as machine 1100 of FIG. 6 that includes processors 1110, memory 1130, and I/O components 1150. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments.

For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application 910 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include a camera device application 967. In certain embodiments, this may be a stand-alone application that operates to manage communications with a server system such as server system 120. In other embodiments, this functionality may be integrated with another application such as a media application 960 or another such application. Curation application 967 may manage collection of content using a camera device of machine 1100, communication with a server system via I/O components 1150, and receipt and storage of received media collections in memory 1130. Presentation of content and user inputs associated with content may be managed by curation application 967 using different frameworks 908, library 906 elements, or operating system 904 elements operating on a machine 1100.

Figure 6:
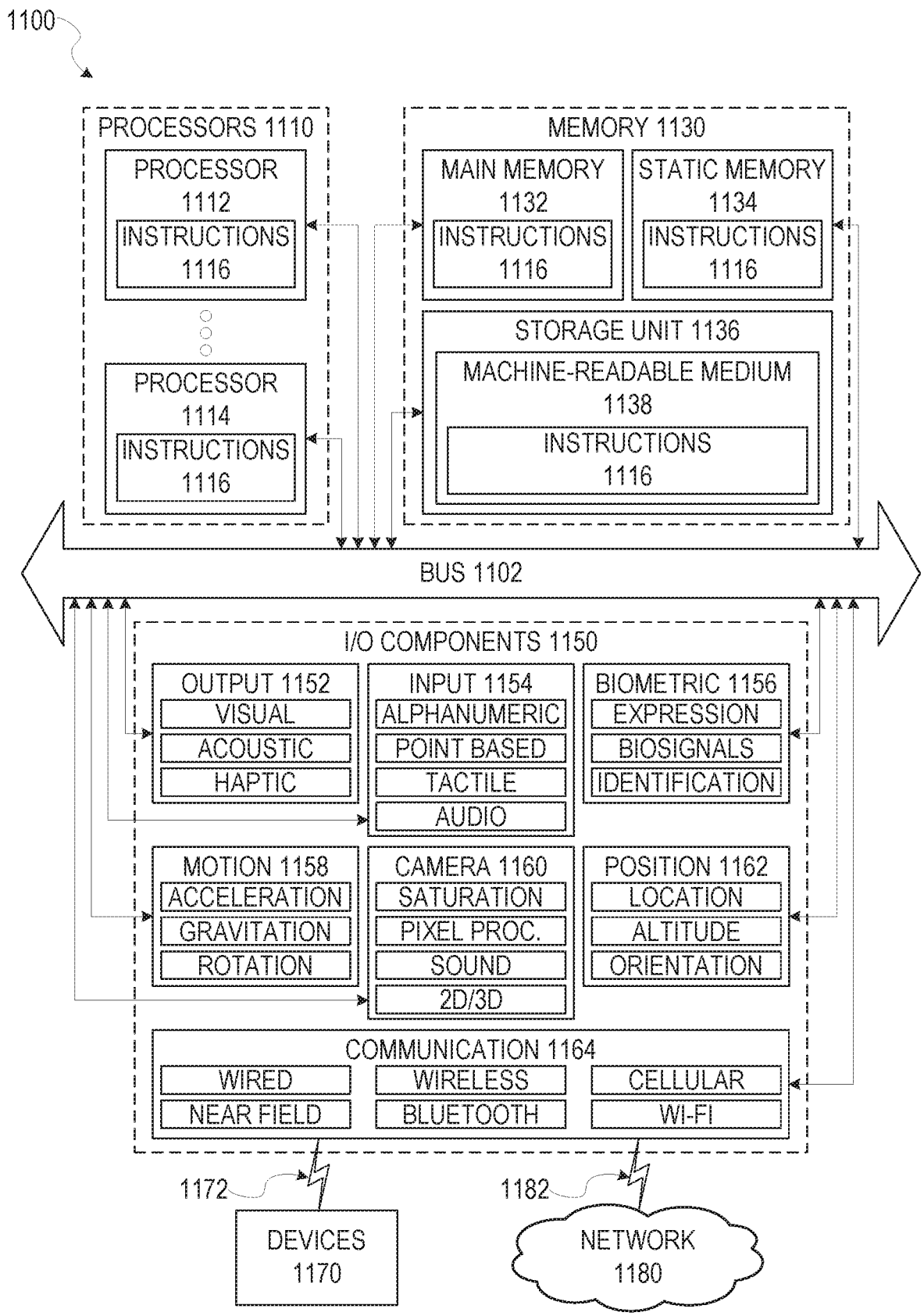
FIG. 6 illustrates a diagrammatic representation of a machine in the form of a computer system within which a set of instructions may be executed for causing the machine to perform any one or more of the methodologies discussed herein, according to some example embodiments.

FIG. 6 is a block diagram illustrating components of a machine 1100, according to some embodiments, able to read instructions from a machine-readable medium (e.g., a machine-readable storage medium) and perform any one or more of the methodologies discussed herein. Specifically, FIG. 6 shows a diagrammatic representation of the machine 1100 in the example form of a computer system, within which instructions 1116 (e.g., software, a program, an application 910, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server or device in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 6 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 6. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 1150 include biometric components 1156, motion components 1158, camera 1160 environmental components, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. Camera components include any information for image capture, such as saturation control, pixel processing, sound capture, three dimensional image processing, etc. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near-field communication (NFC) components. BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network a WI-FI® network, another type of network, or a combination of two or more such networks. For example, the network 1180 or a portion of the network 1180 may include a wireless or cellular network, and the coupling 1180 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA). Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A mobile device comprising:
   a frame;
   an antenna supported by the frame;
   a temple connected to the frame at an articulated joint such that the temple is disposable between a collapsed condition and a wearable condition;
   an electrical switch, wherein the electrical switch is coupled with the articulated joint;

wireless communication circuitry coupled to the electrical switch;

wireless charging match circuitry coupled to the electrical switch, wherein the electrical switch is configured to switch a connection with the antenna to the wireless communication circuitry if the temple is in the wearable condition and to the wireless charging match circuitry if the temple is in the collapsed condition.

2. The mobile device of claim 1, wherein the frame comprises a first portion, and wherein the antenna is coupled to the frame and disposed around the frame.

3. The mobile device of claim 1, wherein the wireless charging match circuitry comprises near field communication (NFC) match and controller circuitry.

4. The mobile device of claim I further comprising:
one or more processors coupled to the wireless communication circuitry, the wireless charging match circuitry, and the electrical switch, wherein the one or more processors are configured to control the electrical switch.

5. The mobile device of claim 4, wherein the one or more processors are configured to communicate payment data via the antenna using the wireless communication circuitry.

6. The mobile device of claim 4 further comprising:
a camera coupled to the one or more processors, the one or more processors configured to operate the camera.

7. The mobile device of claim 1, wherein the antenna is disposed on the frame in one or more loops around a portion of the frame.

8. The mobile device of claim 1, wherein the antenna is disposed on the frame in a complete loop around a portion of the frame.

9. The mobile device of claim 1 further comprising
a battery coupled to the wireless charging match circuitry, wherein the battery is configured to receive a charge from a charge source via inductive coupling with the antenna.

10. The mobile device of claim 1 further comprising:
a second antenna coupled to the wireless communication circuitry, the second antenna supported by the frame.

11. The mobile device of claim 1, wherein the mobile device is eyewear.

12. The mobile device of claim 1 wherein the electrical switch is a first electrical switch and further comprising:
one or more processors coupled to the wireless communication circuitry, the wireless charging match circuitry, and a second electrical switch, wherein the one or more processors are configured to control the second electrical switch;
a memory coupled to the one or more processors, the memory comprising instructions that, when executed by the one or more processors, cause the mobile device to perform operations comprising:
selecting, in response to a first input, a first switch position for the second electrical switch supported by the frame; and
receiving a charge from a charge source via inductive coupling with the antenna when the second electrical switch is in the first switch position.

13. The mobile device of claim 12 further comprising:
a diplexer coupled to the antenna and the wireless communication circuitry; and
radio frequency communication circuitry coupled to the antenna and the diplexer and configured to generate radio frequency signals for transmission via the antenna;
wherein the diplexer electrically separates the wireless communication circuitry and the radio frequency communication circuitry.

14. The mobile device of claim 12, wherein the instructions further cause the mobile device to perform operations comprising:
selecting, in response to a second input, a second switch position for the second electrical switch supported by the frame; and
transmitting radio-frequency signals with the wireless communication circuitry and the antenna.

15. The mobile device of claim 14 further comprising:
a third switch supported by the frame, the third switch coupled to the one or more processors, wherein the third switch is configured to generate the first input and the second input.

* * * * *

UNITED STATES PATENT AND TRADEMARK OFFICE
CERTIFICATE OF CORRECTION

PATENT NO. : 11,415,818 B2
APPLICATION NO. : 16/711004
DATED : August 16, 2022
INVENTOR(S) : Olgun et al.

Page 1 of 1

It is certified that error appears in the above-identified patent and that said Letters Patent is hereby corrected as shown below:

In the Claims

In Column 19, Line 15, in Claim 4, delete "claim I" and insert --claim 1-- therefor In Column 19, Line 33, in Claim 9, after "comprising", insert --:--

Signed and Sealed this
Sixth Day of June, 2023

Katherine Kelly Vidal
*Director of the United States Patent and Trademark Office*